(12) United States Patent
Fux et al.

(10) Patent No.: US 8,896,470 B2
(45) Date of Patent: Nov. 25, 2014

(54) SYSTEM AND METHOD FOR DISAMBIGUATION OF STROKE INPUT

(75) Inventors: Vadim Fux, Waterloo (CA); Xiaoting Sun, Waterloo (CA); Timothy Koo, Cambridge (CA); Aleksej Trefilov, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 1154 days.

(21) Appl. No.: 12/500,733

(22) Filed: Jul. 10, 2009

(65) Prior Publication Data

US 2011/0006929 A1 Jan. 13, 2011

(51) Int. Cl.
*H03K 17/94* (2006.01)
*H03M 11/00* (2006.01)
*G06K 9/18* (2006.01)
*G06F 3/023* (2006.01)
*G06F 3/0489* (2013.01)
*G06F 3/01* (2006.01)

(52) U.S. Cl.
CPC ............ *G06F 3/0237* (2013.01); *G06F 3/0489* (2013.01); *G06F 3/018* (2013.01)
USPC ............................................. 341/28; 382/185

(58) Field of Classification Search
USPC ......... 710/65–74; 341/28; 382/159, 161, 165, 382/182, 185–189; 439/159, 160–162, 165
See application file for complete search history.

(56) References Cited

U.S. PATENT DOCUMENTS

| | | | |
|---|---|---|---|
| 4,689,743 A | 8/1987 | Chiu | |
| 6,970,599 B2 * | 11/2005 | Longe et al. | 382/185 |
| 2004/0223644 A1 * | 11/2004 | Meurs | 382/185 |
| 2006/0047498 A1 | 3/2006 | Fux et al. | |
| 2006/0047628 A1 | 3/2006 | Fux et al. | |
| 2006/0072824 A1 * | 4/2006 | van Meurs | 382/185 |
| 2007/0040707 A1 | 2/2007 | Lai | |
| 2009/0092323 A1 | 4/2009 | Qiu et al. | |

FOREIGN PATENT DOCUMENTS

| | | | |
|---|---|---|---|
| CN | 1427325 | | 7/2003 |
| CN | 1472626 | * | 2/2004 |
| CN | 101122824 | * | 2/2008 |

OTHER PUBLICATIONS

Third Office Action for Application No. 201010228025.9, from the State Intellectual Property Office of People's Republic of China, dated Sep. 12, 2012.
First Office Action for Application No. 201010228025.9, from the Chinese Patent Office, dated Mar. 1, 2012.
Office Communication for Application No. 09165245.3, from the European Patent Office, dated Mar. 3, 2011.
Office Communication for Application No. 09165245.3, from the European Patent Office, dated Aug. 4, 2010.

(Continued)

*Primary Examiner* — Mohammad Ghayour
*Assistant Examiner* — Jerold Murphy
(74) *Attorney, Agent, or Firm* — Finnegan, Henderson, Farabow, Garrett & Dunner LLP

(57) ABSTRACT

An electronic device for disambiguation of stroke input, the device comprising: an input device coupled to the microprocessor for accepting a stroke input; and a stroke disambiguation module resident in the memory for execution by the microprocessor. The device is configured to: receive a signal representing a stroke input sequence at the stroke disambiguation module; apply one or more stroke disambiguation rules to the stroke input sequence to generate an updated input sequence; and transmit a signal representing the updated input sequence.

21 Claims, 10 Drawing Sheets

(1) = 任

(2) = 不

(3) = 模糊

(4) = 谈

(56) References Cited

OTHER PUBLICATIONS

Extended European Search Report for Application No. 09165245.3, from the European Patent Office, dated Oct. 7, 2009.
Fred J. Damerau, A Technique for Computer Detection and Correction of Spelling Errors, Communications of the ACM, vol. 7, No. 3, p. 171-176, Mar. 1, 1964.
Beijing D-Ear Technologies Co., Ltd., "d-Ear Input—Full Sentence Chinese Input for Pocket PC", online article, Jan. 28, 2005.
Gareth Loudon, Olle Pellijeff, Li Zhong-Wei, "A Method for Handwriting Input and Correction on Smartphones", online article, Cyberlab Singapore, Ericcson Research.
"Chinese Character Dictionary", online dictionary.

Office Action for Application No. 2,709,502, from the Canadian Intellectual Property Office, dated Jan. 21, 2013.
Fourth Office Action for Application No. 201010228025.9, from the State Intellectual Property Office of People's Republic of China, dated Mar. 20, 2013.
Rejection Decision for Application No. 201010228025.9, from the State Intellectual Property Office of People's Republic of China, dated Sep. 5, 2013.
Office Action for Application No. 2,709,502, from the Canadian Intellectual Property Office, dated Mar. 3, 2014.
Second Office Action for Application No. 201010228025.9, from the State Intellectual Property Office of People's Republic of China, dated Jun. 11, 2012.

* cited by examiner (1) = 任

SYSTEM AND METHOD FOR DISAMBIGUATION OF STROKE INPUT

TECHNICAL FIELD

The present disclosure relates generally to processing of stroke input, and more particularly to a system and method for disambiguation of stroke input, such as on an electronic device, including a mobile communication device.

BACKGROUND

In some situations, such as when inputting text in the Chinese language on an electronic device, input of text may be based on input of individual strokes that form a character, rather than input of entire characters or symbols. Such stroke input is often long and complicated, and may require the user to enter the strokes in a given sequence in order to produce the desired character.

Often, input of text is aided by a text prediction algorithm, which provides the user with a candidate list containing candidate characters predicted based on the input, from which the user may select the desired character. During stroke input, the user may fail to input a stroke or may input a wrong sequence of strokes. As a result, the user will not be able to find the desired character in the candidate list generated using the input sequence. This typically results in the user having to retype the entire stroke sequence, which may be lengthy. In some situations, the user may not find the desired character in the candidate list even after repeated retyping of the stroke sequence, possibly because the user has not made the proper correction to the stroke sequence. This is a time-consuming and frustrating process.

It would be desirable to provide a solution to address at least some of these challenges.

BRIEF DESCRIPTION OF THE DRAWINGS

Reference will now be made to the drawings, which show by way of example embodiments of the present disclosure, and in which:

FIG. 3 shows example characters for stroke input;

It will be noted that throughout the appended drawings, like features are identified by like reference numerals.

DETAILED DESCRIPTION

In some aspects there is provided an electronic device for disambiguation of stroke input, the device comprising: a microprocessor for controlling the operation of the device; an input device coupled to the microprocessor for accepting a stroke input; a display device for showing a graphical user interface, the display device being coupled to the microprocessor for communicating an output to the user; and a memory coupled to the microprocessor; the device including a stroke disambiguation module resident in the memory for execution by the microprocessor, the device being configured to: receive a signal representing a stroke input sequence at the stroke disambiguation module; apply one or more stroke disambiguation rules to the stroke input sequence to generate an updated input sequence; and transmit a signal representing the updated input sequence.

In some aspects, there is provided a method for disambiguation of stroke input comprising: receiving a signal representing a stroke input sequence; applying one or more stroke disambiguation rules to the stroke input sequence to generate an updated input sequence; and transmitting a signal representing the updated input sequence.

In some aspects, there is provided a computer program product having computer executable instructions tangibly recorded thereon for disambiguation of stroke input, the computer program product comprising: code for receiving a signal representing a stroke input sequence; code for applying one or more stroke disambiguation rules to the stroke input sequence to generate an updated input sequence; and code for transmitting a signal representing the updated input sequence.

The device, method and computer program product described above may also apply a text prediction algorithm on the updated input sequence, at the text prediction module, to predict one or more candidates; and transmit a signal representing the one or more candidates to be provided for selection in a candidate list.

Figure 1:
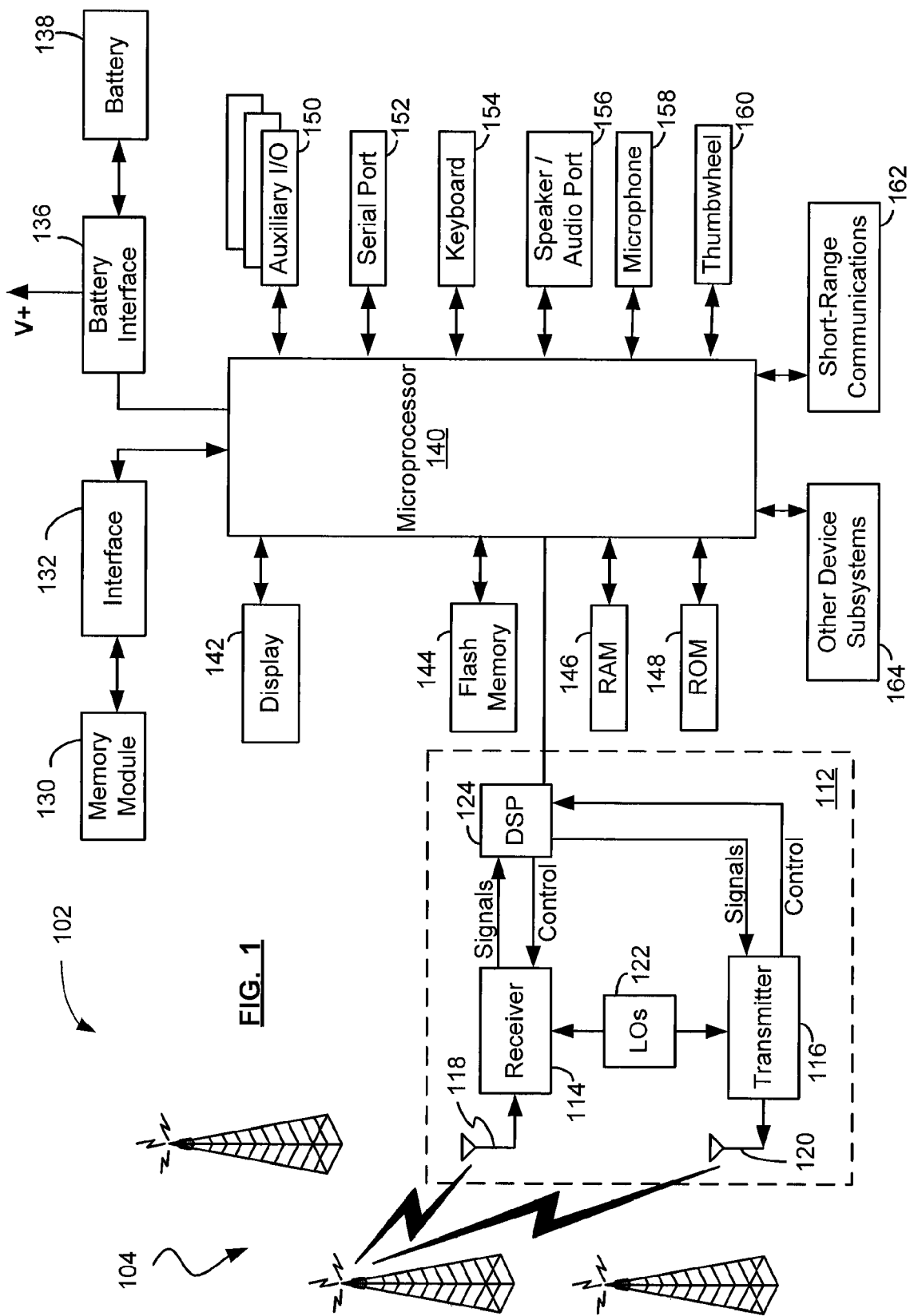
FIG. 1 shows in block diagram form an electronic device suitable for disambiguation of stroke input in accordance with an example embodiment.

Reference is first made to FIG. 1, which shows a block diagram illustrating an example embodiment of an electronic device 102 suitable for carrying out disambiguation of stroke input in accordance with an example embodiment of the present disclosure. It will be understood that references to an electronic device in this disclosure may also refer to a wireless device, a wireless communication device or a mobile communication device. Although this disclosure describes an electronic communication device and a wireless device, the teachings of this disclosure may also be applicable to any device that accepts stroke input, and is not limited to wireless devices or communication devices. The device 102 may communicate through a wireless communication network 104. The wireless network 104 may include antennae, base stations, and supporting radio equipment as for supporting wireless communications between the device 102 and other devices connected to wireless network 104. The wireless network 104 may be coupled to a wireless network gateway and to a wide area network.

In an example embodiment, the device 102 may be a two-way mobile communication device having at least voice and data communication capabilities, including the capability to communicate with other computer systems. In an example embodiment, the device 102 is a clamshell handheld device. Depending on the functionality provided by the device 102, it may be referred to as a data messaging device, a two-way pager, a cellular telephone with data messaging capabilities, a wireless Internet appliance, a data communication device (with or without telephony capabilities), or a touchscreen device. The device 102 may communicate with any one of a plurality of fixed transceiver stations within its geographic coverage area.

The device 102 incorporates a communication subsystem 112, which may include a receiver 114, a transmitter 116, and associated components, such as one or more antenna elements 118 and 120, local oscillators (LOs) 122, and a processing module such as a digital signal processor (DSP) 124. In an example embodiment, the antenna elements 118 and 120 may be embedded or internal to the device 102. As will be apparent to those skilled in the field of communications, the particular design of the communication subsystem 112 may depend on the wireless network 104 in which the device 102 is intended to operate.

The device 102 may send and receive communication signals over the wireless network 104 after the required network registration or activation procedures have been completed. Signals received by the antenna 118 through the wireless network 104 may be input to the receiver 114, which may perform such common receiver functions as signal amplification, frequency down conversion, filtering, channel selection, etc., as well as analog-to-digital (A/D) conversion. A/D conversion of a received signal may allow more complex communication functions such as demodulation and decoding to be performed in the DSP 124. In a similar manner, signals to be transmitted may be processed, including modulation and encoding, for example, by the DSP 124. These DSP-processed signals may be input to the transmitter 116 for digital-to-analog (D/A) conversion, frequency up conversion, filtering, amplification, and transmission to the wireless network 104 via the antenna 120. The DSP 124 may not only process communication signals, but may also provide for receiver and transmitter control. For example, the gains applied to communication signals in the receiver 114 and the transmitter 116 may be adaptively controlled through automatic gain control algorithms implemented in the DSP 124.

Network access may be associated with a subscriber or user of the device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card may be inserted in or connected to an interface 132 of the device 102 in order to operate in conjunction with the wireless network 104. Alternatively, the device 102 may have an integrated identity module for use with systems such as Code Division Multiple Access (CDMA) systems.

The device 102 also includes a battery interface 136 for receiving one or more rechargeable batteries 138. The battery 138 provides electrical power to at least some of the electrical circuitry in the device 102, and the battery interface 136 provides a mechanical and electrical connection for the battery 138. The battery interface 136 may be coupled to a regulator (not shown) which may provide power V+ to the circuitry of the device 102.

The device 102 includes a microprocessor 140 which may control the overall operation of the device 102. Communication functions, including at least data and voice communications, may be performed through the communication subsystem 112. The microprocessor 140 may also interact with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a short-range communications subsystem 162, and any other device subsystems generally designated as 164. Some of the subsystems shown in FIG. 1 may perform communication-related functions, whereas other subsystems may provide "resident" or on-device functions. Notably, some subsystems, such as the keypad 154, the display 142, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 may be stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the device 102. A predetermined set of applications that control basic device operations, including data and voice communication applications, may normally be installed on the device 102 during or after manufacture. The device 102 may include a personal information manager (PIM) application having the ability to organize and manage data items relating to a user such as, but not limited to, instant messaging, email, calendar events, voice mails, appointments, and task items. One or more memory stores may be available on the device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications have the ability to send and receive data items via either the wireless network 104 or a link to a computer system. The link to the computer system may be via the serial port 152 or the short-range communications subsystem 162. In an example embodiment, PIM and/or media data items may be seamlessly combined, synchronized, and updated via the wireless network 104, with the device user's corresponding data items stored and/or associated with a host computer system thereby creating a mirrored or partially mirrored host computer on the device 102 with respect to such items. This may be useful where the host computer system is the device user's office computer system. Additional applications may also be loaded onto the device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation may increase the functionality of the device 102 and may provide enhanced on-device functions, communication-related functions, or both. For example, secure communication applications may enable electronic commerce functions and other such financial transactions to be performed using the device 102.

In a data communication mode, a received data signal representing information such as a text message, an email message, a media file to be transferred, or Web page download is processed by the communication subsystem 112 and is input to the microprocessor 140. The microprocessor 140 may further process the signal for output to the display 142, or alternatively to the auxiliary I/O device 150. A user of the device 102 may also compose data items, such as email messages, for example, using the keypad 154 and/or the clickable thumbwheel 160 in conjunction with the primary display 142 and possibly the auxiliary I/O device 150. The keypad 154 may be either a complete alphanumeric keypad or telephone-type keypad. In some example embodiments where the device 102 is a touchscreen device, the keypad 154 may be replaced or augmented with a virtual keypad having virtual keys and displayed on the touchscreen. These composed items may be transmitted through the communication subsystem 112 over the wireless network 104 or via the short range communication subsystem 162.

For voice communications, the overall operation of the device 102 may be similar, except that the received signals are output to the speaker or audio port 156 and signals for transmission would be generated by a transducer such as the microphone 158. Alternative voice or audio I/O subsystems, such as a voice message recording subsystem, may also be implemented on the device 102. Although voice or audio signal output may be typically accomplished primarily through the speaker or audio port 156, the display 142 may also be used to provide an indication of the identity of a calling party, duration of a voice call, or other voice call related information. Stereo headphones or an earpiece may also be used in place of the speaker 156.

The serial port 152 is typically implemented in a personal digital assistant (PDA) type communication device for which synchronization with a user's computer is a desirable, albeit optional, component. The serial port 152 may enable a user to set preferences through an external device or software application and may extend the capabilities of the device 102 by providing for information or software downloads to the device 102 other than through the wireless network 104. The alternate download path may, for example, be used to load software or data files onto the device 102 through a direct, reliable and trusted connection.

The short-range communications subsystem 162 may be an additional optional component which provides for communication between the device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another example embodiment, the short-range communications subsystem 162 may be a wireless networking communications subsystem, conforming to IEEE 802.11 standards such as one or more of 802.11b, 802.11g, or 802.11n.

Figure 2:
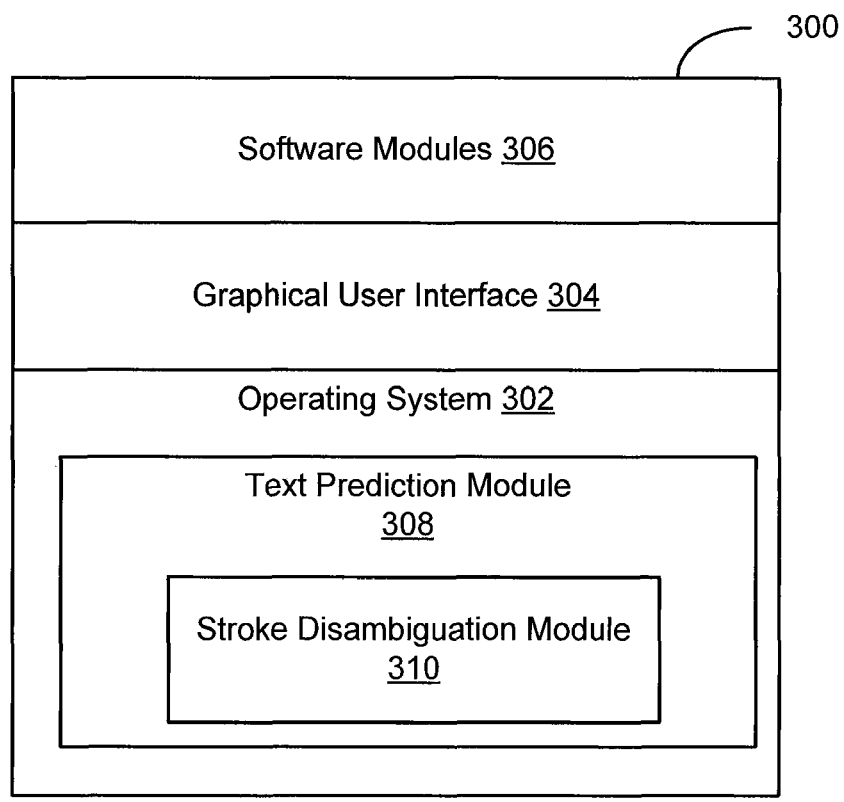
FIG. 2 shows in block diagram form the contents of a memory of the device of FIG. 1.

Reference is next made to FIG. 2, which shows a block diagram illustrating an example embodiment of a memory 300 of the device 102. The memory 300 has various software components for controlling the device 102 and may include, for example, the flash memory 144, the RAM 146, the ROM 148, the memory module 130 and/or the other device subsystems 164. In accordance with an example embodiment, the device 102 is a multi-tasking mobile communication device for sending and receiving data items, such as instant messages, for making and receiving voice calls, and for creating events and alerts. To provide a user-friendly environment to control the operation of the device 102, an operating system (OS) 302 resident on the device 102 may provide a basic set of operations for supporting various applications typically operable through a user interface such as a graphical user interface (GUI) 304.

In this example embodiment, the OS 302 comprises a text prediction module 308 for applying a text prediction algorithm. In this disclosure, the term "text" may refer to non-alphabet-based text, such as Chinese characters or other stroke character-based text. The text prediction module 308 is used to predict candidate text based on partial input of a desired text. In the case where the text is Chinese characters, the text prediction module 308 may be used to predict candidate characters based on partial input of a stroke sequence for the desired character. The OS 302 also comprises a stroke disambiguation module 310 for disambiguation of stroke input. In this example, the stroke disambiguation module 310 is part of the text prediction module 308. The stroke disambiguation module 310 may alternatively be separate from the text prediction module 308. The OS 302 may also provide basic input/output system features to obtain input from the auxiliary I/O 150, the keypad 154, the clickable thumbwheel 160, and other input devices, and to facilitate output to the user via the display 142. The GUI 304 is typically a component of the OS 302. One or more software modules 306 for managing communications or providing a personal digital assistant (PDA) or other functions may also be included.

The memory 300 may also include an email and calendar client, which may be combined in, for example, a PIM application having email-based calendaring and scheduling functions. Typically, the PIM may be installed as one of the software modules 306. The text prediction module 308 and the stroke disambiguation module 310 may be included among the software modules 306. Thus, the device 102 may include computer executable programmed instructions for directing the device 102 to implement various applications. The programmed instructions may be tangibly embodied in the one or more software modules 306 resident in the memory 300 of the device 102. Alternatively, the programmed instructions may be tangibly embodied on a computer readable medium (such as a DVD, CD, floppy disk or other storage media) having computer executable instructions tangibly recorded thereon, which may be used for transporting the programmed instructions to the memory 300 of the device 102. Alternatively, the programmed instructions may be embedded in a computer-readable, signal-bearing medium that may be uploaded to the wireless network 104 by a vendor or supplier of the programmed instructions, and this signal-bearing medium may be downloaded through one or more of the interfaces 112, 150, 152, 162 to the device 102 from, for example, the wireless network 104 by end users.

A user may interact with the device 102 and its software modules 306 using the GUI 304. The GUI 304 may be controlled by the operating system 302 (FIG. 2) and may provide a display format providing information to the user, or enabling the user to choose commands, execute application programs, manage computer files, and perform other functions by selecting pictorial representations (i.e., icons), or selecting items from a menu through the use of an input or pointing device such as the clickable thumbwheel 160 or the keypad 154. Generally, the GUI 304 may be used to convey information and receive commands from users and includes a variety of GUI objects or controls including icons, toolbars, drop-down menus, pop-up menus, text, dialog boxes, buttons, etc. A user may interact with the GUI 304 presented on the display 142 by using an input or pointing device to position a pointer or cursor over an object (i.e., "pointing" at the object) and by "clicking" on the object (e.g., by depressing the thumbwheel 160 or a button on the keypad 154, or making a selecting using a virtual keyboard, etc.). This may be referred to as a point-and-click or selection operation. Typically, the object is highlighted (e.g., shaded) when it is selected or pointed at by the pointer or cursor to indicate that the object is selectable. Interaction with the GUI 304 may also be by touch, for example where the device 102 uses a touchscreen display.

Typically, a GUI-based system presents application, status, and other information to the user on the display 142. For example, the GUI 304 may provide a window, which may be a display area shown within the display 142, which may be rectangular, in which a user may view an application or document. The window may be open, closed, displayed full screen, reduced to an icon, increased or reduced in size, or moved to different areas of the display 142. Multiple windows may be displayed simultaneously. For example, the windows may be displayed within other windows, overlapped with other windows, or tiled within the display area.

The microprocessor 140 may be coupled to one or more input devices (e.g., the keypad 154, the clickable thumbwheel 160) for receiving user commands, selections or queries, and the display 142 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the display 142. The microprocessor 140 may also be coupled to the memory 300.

According to the teachings of the present disclosure, one or more disambiguation rules are used to determine probable characters for a sequence of stroke input. Context of any preceding text may be taken into account for text prediction. For some characters, such as Chinese characters, intermediates (e.g., a recognized part of a character inputted, such as a radical) may be used to guide disambiguation. The strokes alphabet represents a finite set of symbols. Depending on the type of input (e.g., language, input system) the number of different strokes for input may vary, for example anywhere from 2 to 5. For example, the Wubizixing (commonly known as Wubi) method for inputting Chinese characters has 5 different strokes and an optional wildcard available for input. Other stroke input methods, whether for Chinese or other stroke-based languages, may have different input strokes and different functionality.

Using one or more disambiguation rules, disambiguation of stroke input determines invalid stroke input and may make appropriate suggested corrections. The disambiguation rules, for example, are based on the principle that a set of the strokes represents a character, and that this character is frequently part of a longer word. Some example rules for disambiguation of stroke input are described below. These rules are applied by the stroke disambiguation module 310.

Possible stroke input errors include omission of a stroke in an input sequence, entry of strokes in an incorrect order within an input sequence, and entry of an incorrect stroke. One or more disambiguation rules may correct for one or more of these errors.

Where a stroke is omitted, a disambiguation rule may be applied to add the missing stroke into the existing input sequence.

Where an incorrect stroke is entered (e.g., a right to left stroke is inputted instead of a left-top to right-bottom stroke), a disambiguation rule may be applied, which is based on the visual similarity of the strokes.

Where strokes are entered in an incorrect sequence (e.g., strokes are incorrectly entered starting from the left of a character instead of the top), a disambiguation rule may be applied to correct the order of the strokes in the input sequence.

In an example embodiment, for any given input sequence, after application of the text prediction algorithm, if there are not enough candidate characters or intermediates (e.g., no valid candidates are found), or if an instruction to provide more candidates is received (e.g., in response to a selection to provide more candidates), the stroke disambiguation module 310 applies one or more of the disambiguation rules, such as those described above, in order to provide the text prediction module 308 with an updated or corrected stroke input sequence for text prediction, which may result in an enlarged or updated list of candidates. The text prediction module 308 may additionally consider the context of the previous text to determine the probability of a candidate being the desired text. The use of one or more disambiguation rules and/or context for text prediction may be activated at any point during stroke input, for example in response to an input or automatically.

An example of disambiguation of stroke input is described below. This example describes an example set of disambiguation rules, and may be carried out by the text prediction module 308 and the stroke disambiguation module 310. In this example, it may be assumed that at least the initial stroke in the stroke input sequence is correct. In this example, the stroke input is for entering a Chinese character using the Wubi input method.

Figure 3:
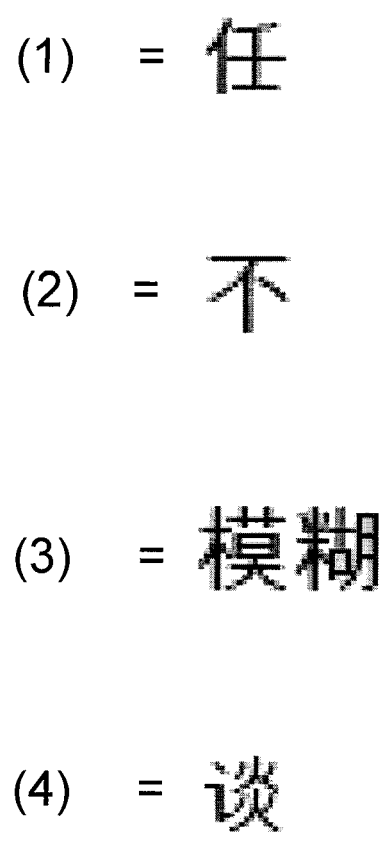

For ease of reference, characters (1), (2), (3) and (4) referred to in the examples described below are shown in FIG. 3.

Disambiguation rule 1—"wrong strokes": incorrect strokes, for example up to two incorrect strokes, may be included in the input sequence, and the application of this disambiguation rule corrects these incorrect strokes.

An example algorithm for implementing the "wrong strokes" disambiguation rule is now described, in particular with reference to the Wubi stroke input method. In this example, the stroke sequences for all valid characters are stored in a stroke sequence database, for example within the stroke disambiguation module 310. For the Wubi stroke input method, where each stroke input is associated with an integer value from "1" to "5", the stroke sequences may be ordered within the database according to integer values. When a stroke input sequence is received at the stroke disambiguation module 310, the stroke sequence database is searched for all valid stroke sequences having the same initial stroke and same number of strokes. For example, if a stroke input sequence is "345323545", the stroke disambiguation module 310 searches the stroke sequence database for all valid stroke sequences beginning with the stroke associated with "3" and having 9 strokes. The search results are compared with the input sequence on a stroke-by-stroke basis. If a stroke sequence from the database differs from the input sequence by only one or two strokes, that stroke sequence from the database is considered a possible sequence for disambiguation, and all characters corresponding to that stroke sequence are considered candidates for the input sequence. For example, for the input sequence "345323545", one search result may be "343313545", which differs from the input sequence at the third and fifth entries. Thus, "343313545" is considered a possible stroke sequence for disambiguation and all characters having this stroke sequence are provided as candidates. Although this example describes the correction of only one or two incorrect stroke inputs, the "wrong strokes" disambiguation rule may also correct for three or more incorrect strokes, using a similar algorithm as described above or a different algorithm.

Figure 4A:
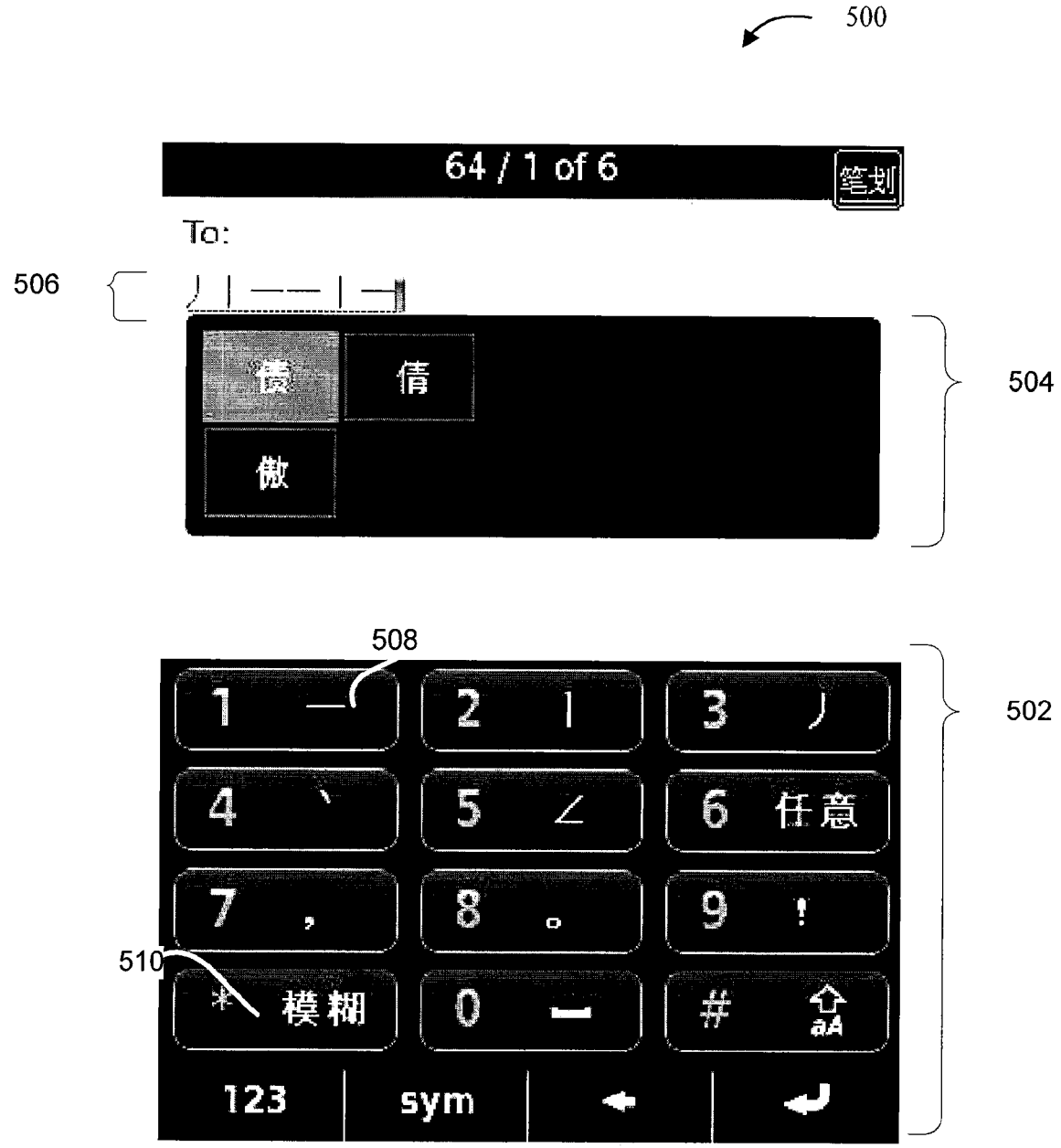
FIGS. 4A and 4B each show an example graphical user interface for disambiguation of stroke input, in accordance with an example embodiment.
Figure 4B:
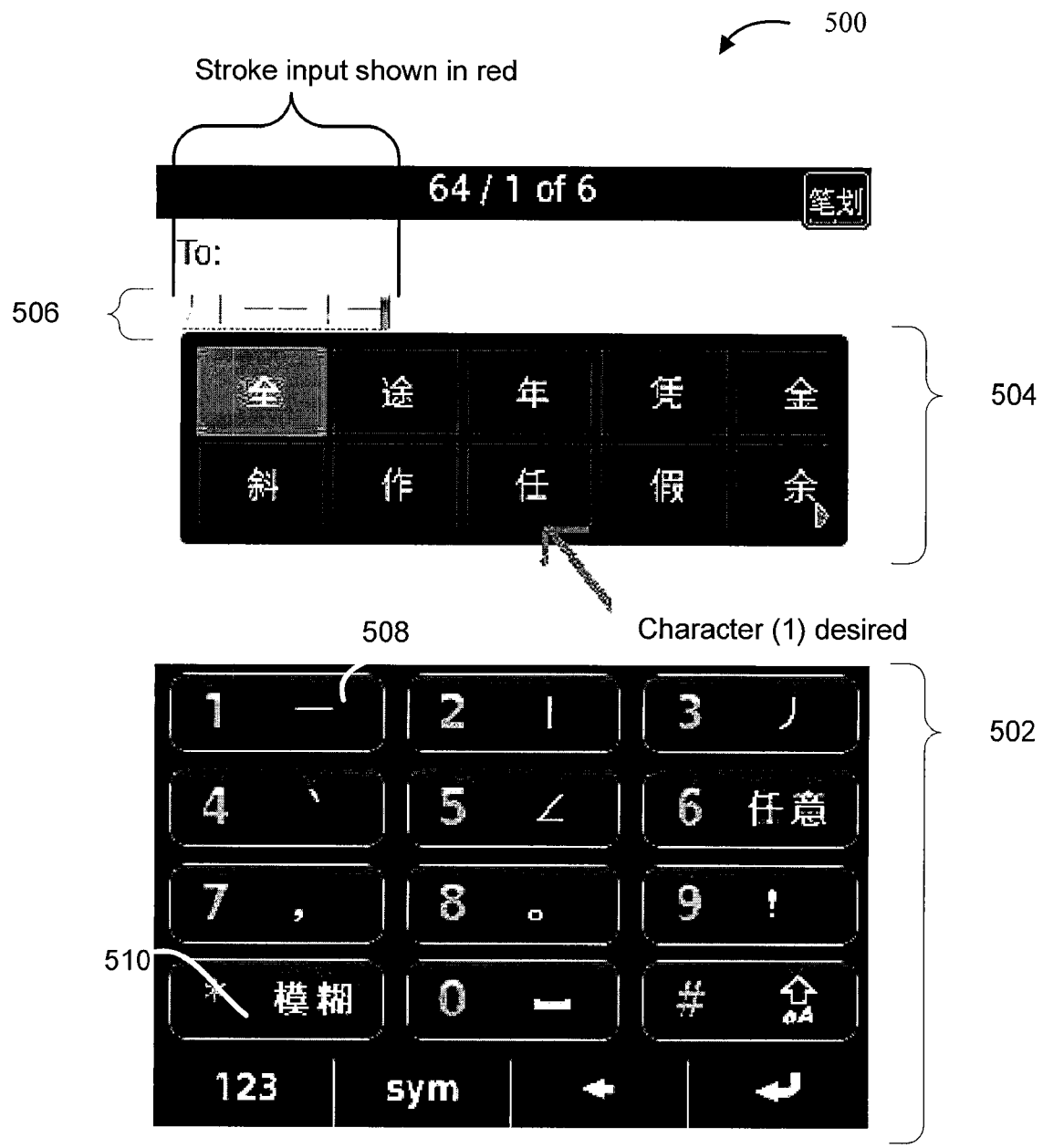

Referring now to FIGS. 4A and 4B, an example graphical user interface 500 is shown, illustrating the application of the "wrong strokes" rule. The graphical user interface 500 includes a stroke input portion 502, a candidate portion 504 and a stroke sequence portion 506. The stroke input portion 502 provides one or more stroke input keys 508, which may be virtual keys in examples where the device 102 has a touchscreen display. The example shown may be suitable for stroke input using the Wubi method, in which there are five distinct stroke inputs and one wildcard input. The stroke input portion 502 also includes a disambiguation or "fuzzy" key 510, in this example indicated by the word (3). Selection of the "fuzzy" key, for example by a user input, may instruct the text prediction module 308 to apply one or more disambiguation rules. The stroke input portion 502 may include other keys, including modifier keys such as a "CAPS" key and other keys unrelated to text input. The candidate portion 504 displays a list of candidates found by the text prediction module 308, and the candidates shown may be selectable to be added to a text composition. The candidates may be provided in an order corresponding to a predicted probability of being a desired candidate. The stroke sequence portion 506 displays the current stroke input sequence.

In the example shown, using the Wubi input method, the correct strokes for the Chinese character (1) are "323121". The input sequence entered is "321121", which has an incorrect input at the third stroke entry. Selection of the disambiguation or "fuzzy" key 510, for example by a user, triggers the application of the disambiguation rules to this stroke sequence. The application of the "wrong strokes" disambiguation rule corrects the stroke error, allowing the text prediction module 308 to predict the candidate (1).

FIG. 4B shows the graphical user interface 500 after application of one or more disambiguation rules, in this example after application of the "wrong strokes" disambiguation rule. The candidate portion 504 shows a list of candidates updated subsequent to the application of the one or more disambiguation rules, and the list of candidates now includes the desired character (1). When using the disambiguation rules, any stroke input that is considered incorrect (e.g., does not fit any known input sequence for a selected character or intermediate) may be flagged as such to the user, for example by highlighting incorrect stroke input in red. The strokes or stroke sequence in this example have been highlighted, for example by being rendered in red, after application of the disambiguation rules, to indicate that one or more disambiguation rules have been applied to the strokes or stroke sequence. This highlighting may also indicate that the highlighted stroke or strokes are incorrect for the selected candidate. If the user selects a candidate generated based on the stroke input prior to the application of one or more disambiguation rules (i.e., the stroke input before correction), this highlighting may be removed.

Disambiguation rule 2—"swap": A swap is the disorder of one or more strokes within a stroke input sequence, which is corrected by the use of the "swap" disambiguation rule. For example, if the correct Wubi stroke input for a character is "25114512", the user may input "25145112", which incorrectly swaps the first "1" input to the 6th position. In one example, the Wubi input for the Chinese character (2) is "1324". The user types 1234, swapping the "2" and "3". This disambiguation rule corrects this error and predicts the character (2).

An example algorithm for implementing the "swap" disambiguation rule is now described, in particular with reference to the Wubi stroke input method. Typically, this algorithm may correct only one incorrect swap. As in the example described above for the "wrong strokes" disambiguation rule, in this example, the stroke sequences for all valid characters are stored in a stroke sequence database, for example within the stroke disambiguation module 310. For the Wubi stroke input method, where each stroke input is associated with an integer value, the stroke sequences may be ordered within the database according to integer values. When a stroke input sequence is received at the stroke disambiguation module 310, the stroke sequence database is searched for all valid stroke sequences having the same initial stroke and same number of strokes. For example, if a stroke input sequence is "25145112", the stroke disambiguation module 310 searches the stroke sequence database for all valid stroke sequences beginning with the stroke associated with "2" and having 8 strokes. The search results are compared with the input sequence on a stroke-by-stroke basis. If a stroke sequence from the database differs from the input sequence by only one swap (i.e., two strokes with switched positions within the sequence), that stroke sequence from the database is considered a possible sequence for disambiguation, and all characters corresponding to that stroke sequence are considered candidates for the input sequence. For example, for the input sequence "25145112", one search result may be "25141512", which differs from the input sequence in that the fifth and the sixth inputs are swapped. Thus, "25141512" is considered a possible stroke sequence for disambiguation and all characters having this stroke sequence are provided as candidates.

The application of one or more disambiguation rules in response to an input may allow the list of candidates to be expanded or updated to include a desired character, even where the text prediction module 308 predicts one or more valid candidates for the input sequence before applying any disambiguation rules. In such cases, the updated candidate list may exclude previously presented candidates, to avoid cluttering up the candidate list. The disambiguation rules may not be constantly applied, in order to avoid cluttering the candidate list with unnecessary candidates.

The text prediction module 308 may also instruct the stroke disambiguation module 310 to apply one or more disambiguation rules automatically, even without receiving any input to do so. For example, the disambiguation rules may be automatically applied where no candidates are found for a given stroke input sequence. This automatic application of the disambiguation rules may occur at the first stroke in the input sequence that results in no candidates being found. That first incorrect stroke, and all subsequent strokes, may be highlighted, such as being displayed in red, to indicate the application of disambiguation rules to correct a stroke input error.

Figure 5A:
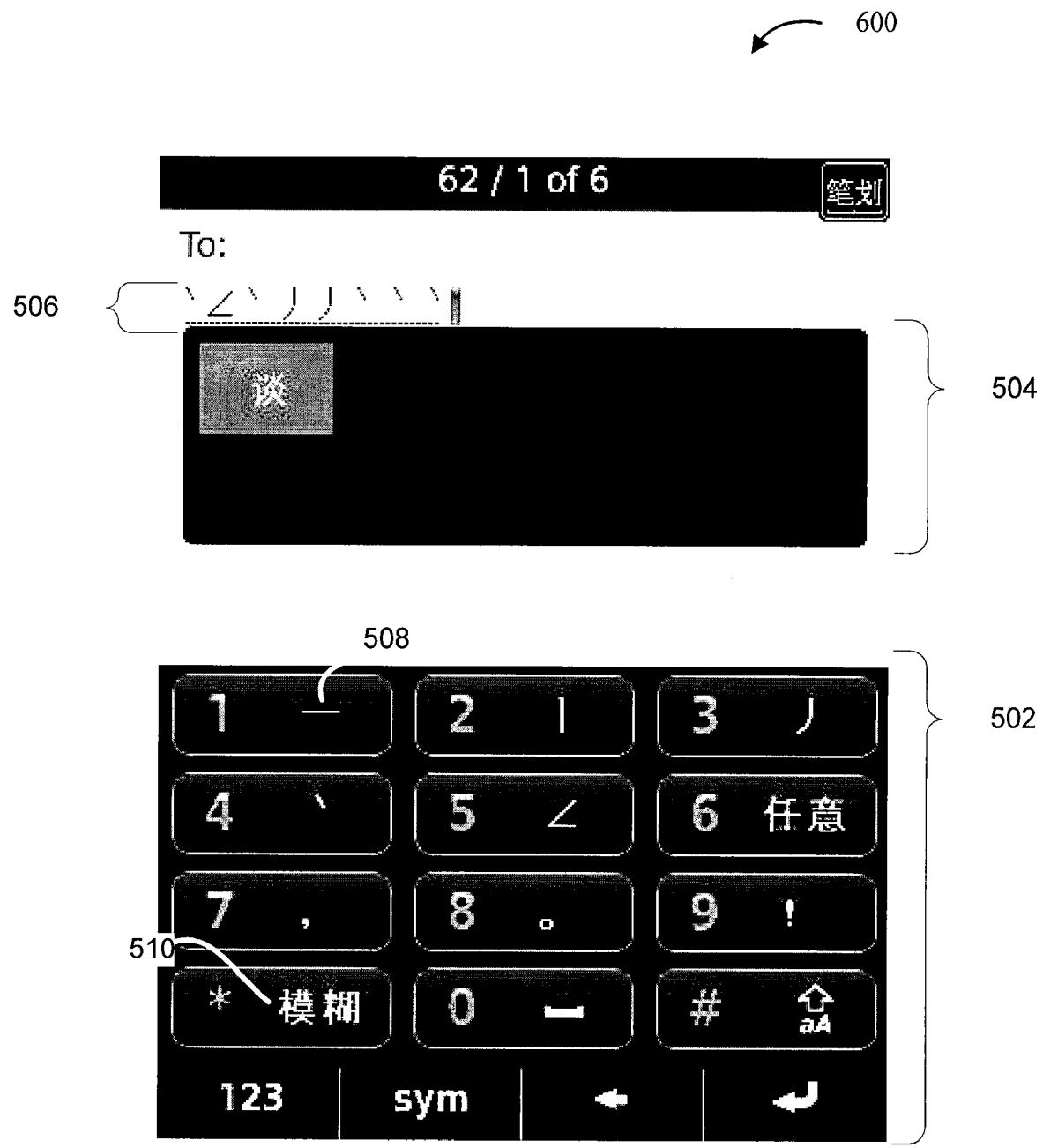
FIGS. 5A and 5B each show an example graphical user interface for disambiguation of stroke input, in accordance with another example embodiment.
Figure 5B:
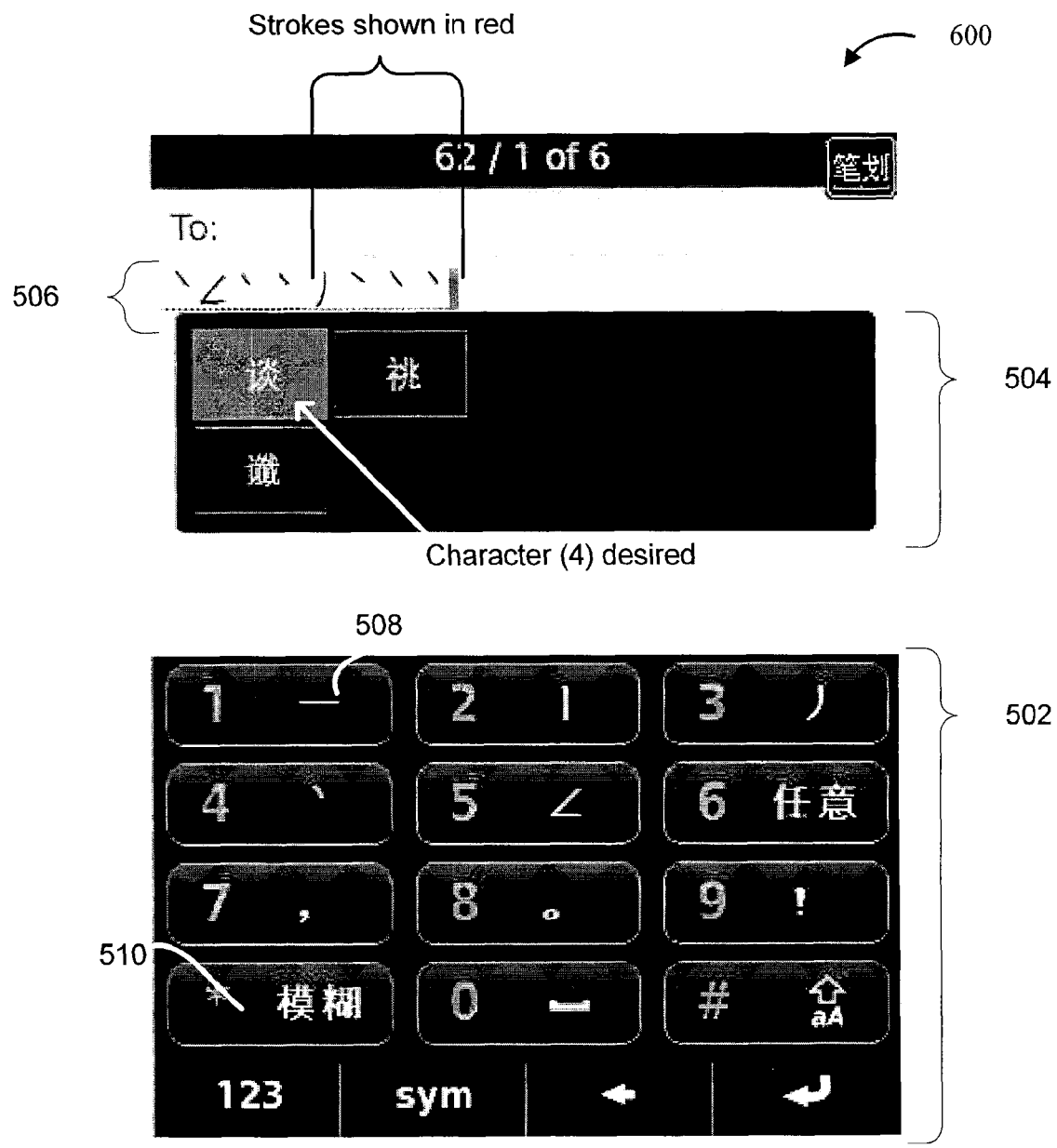

An example graphical user interface 600 is shown in FIGS. 5A and 5B, illustrating the automatic application of one or more disambiguation rules. In the Wubi method, the character (4) has the correct stroke input sequence "45433444", as shown in FIG. 5A. In FIG. 5B, the user types "45443444". The stroke sequence beginning with the fifth stroke is determined by the text prediction module 308 to have no valid matching candidate characters. The text prediction module 308 automatically sends a signal to the stroke disambiguation module 310 to apply the disambiguation rules. After application of the disambiguation rules, all strokes from the fifth stroke onwards are highlighted, for example they may be shown in red, and disambiguation rules are automatically applied to the input from the fifth stroke onwards. This results in the desired character (4) being shown in the candidate list in the candidate portion 504, as shown, even without having received any input to apply any disambiguation rules. Although the figures show complete input sequences, typically, one or more disambiguation rules are automatically applied at the first input that results in less than the minimum required number of candidates (e.g., less than one) being predicted by the text prediction module 308. The disambiguation rules typically continue to be applied to any subsequent strokes inputted.

Although certain disambiguation rules have been discussed, these are provided as examples. Other disambiguation rules may be applied. For example, another disambiguation rule may be the correction of an omitted stroke in a stroke input sequence. The algorithm for implementing such a rule may be similar to those described above—that is, by searching a database of valid stroke sequences and comparing results with the input sequence. Not all of the rules discussed need to be applied. In general, one or more disambiguation rules are preset in the stroke disambiguation module 310, and disambiguation of stroke input involves the application of all disambiguation rules preset in the stroke disambiguation module 310. In some example embodiments, the disambiguation rules only correct for errors (e.g., incorrect stroke input) that are visually similar to the correct input.

In some examples, such as for input of Chinese characters, some characters may contain intermediates (e.g., distinct portions of the characters, also known as radicals). Although the disambiguation rules have been described in examples showing input of complete characters, the disambiguation rules may also be applied for input of intermediates, and text prediction may be used to predict candidate intermediates. Selection of a predicted intermediate may guide text prediction of a complete character by narrowing predicted candidates to those containing the selected intermediate.

Previously-entered text may also be used as context in the text prediction algorithm to help in determining the probable suitability of a candidate character or intermediate. For example, where a certain word is composed of two or more characters, the presence of the first character of that certain word may result in the second character of that word having a higher or lower probability of being a desired character. In an example embodiment, a database of character groupings forming valid words is stored in the stroke disambiguation module 310, and this database is searched to determine the probability of a candidate character in the context of one or more preceding characters. When the candidates are provided to the user, the candidates may be ordered in descending probability, such that candidates with a greater probability of being a desired character are placed higher on the list of candidates provided for selection. If it is known that a certain character cannot follow a given preceding character, then that certain character may be omitted from the candidate list or ranked lower on the candidate list.

Figure 6A:
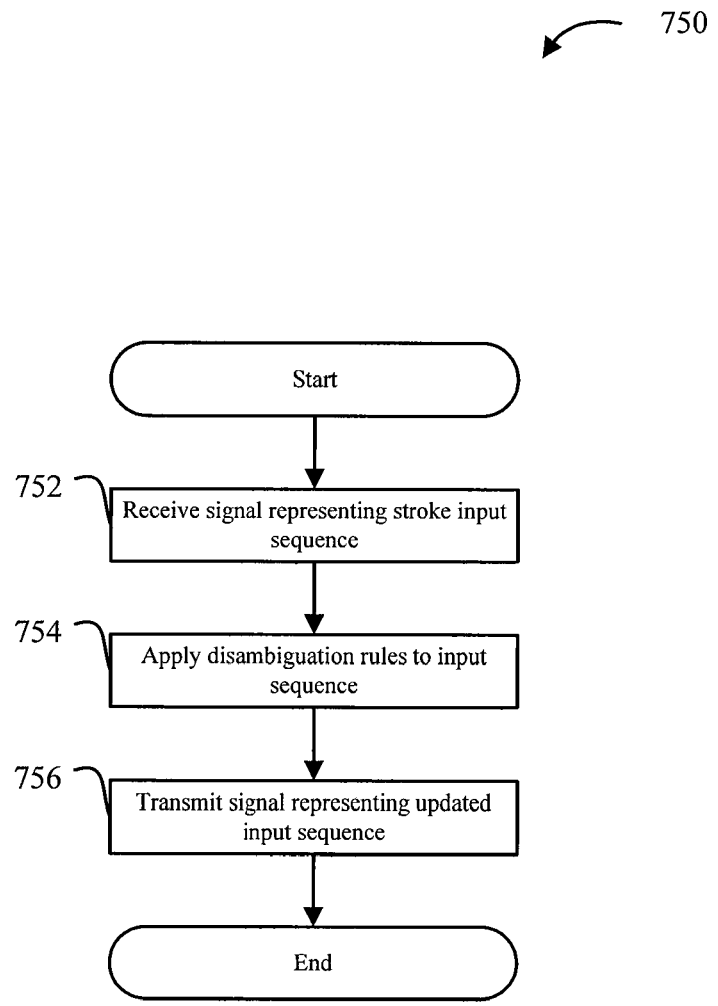
FIG. 6A is a flowchart illustrating a method for disambiguation of stroke input in accordance with an example embodiment.

Reference is now made to FIG. 6A, showing an example method 750 for disambiguation of stroke input. In some examples, the first stroke input in a stroke sequence is assumed to be correct, and the method 750 is used only for subsequent stroke input in the stroke sequence.

At 752, a signal representing an input sequence is received. This signal may be received at the stroke disambiguation module 310. In some examples, stroke disambiguation may only be applied to input sequences having two or more strokes.

At 754, one or more disambiguation rules are applied to the input sequence. For example, one or more of the disambiguation rules described above may be applied. The disambiguation rules, where more than one is applied, may be applied in a fixed or preset order. One or more disambiguation rules may be applied more than once to the input sequence.

At 756, the updated or corrected input sequence, after application of one or more disambiguation rules, is transmitted. For example, the updated input sequence may be transmitted from the stroke disambiguation module 310 to the text prediction module 308.

Figure 6B:
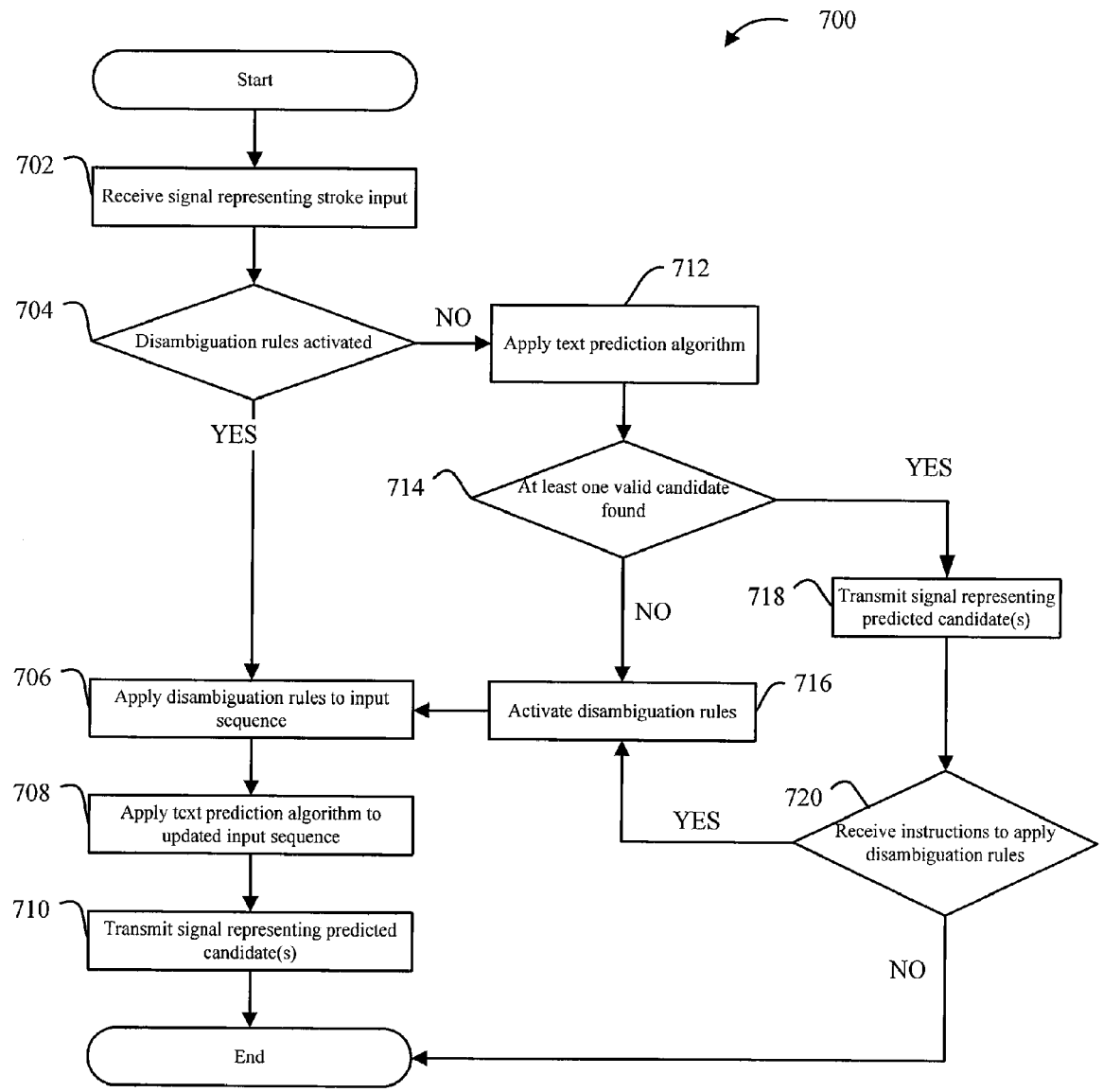
FIG. 6B is a flowchart illustrating a method of disambiguation of stroke input in text prediction, incorporating the method of FIG. 6A, in accordance with an example embodiment.

Reference is now made to FIG. 6B, showing an example method 700 for disambiguation in text prediction. The method 700 illustrates an example of how the method 750 may be incorporated into text prediction.

At 702, a signal representing a stroke input is received at the text prediction module 308. For example, this signal may be received from the OS 302. This stroke input may be part of a longer stroke input sequence.

At 704, the text prediction module 308 determines whether disambiguation rules should be applied (e.g., if one or more disambiguation rules were applied to an earlier stroke in the input sequence, the rules may continue to be applied for all subsequent strokes in the input sequence). For example, this may be by checking a flag, which may be stored in the stroke disambiguation module 310. If the stroke input received is the first stroke in an input sequence, disambiguation rules may be not applied, for example where the first input stroke is assumed to be correct, even if there is an indicator that the disambiguation rules should be applied. Typically, the disambiguation rules are not constantly applied for all input, and may be applied only in response to a received instruction to do so (e.g., a user selection of the disambiguation or "fuzzy" key 510) or in response to an automatic trigger after applying a text prediction algorithm (e.g., where less than a minimum required number of candidates are predicted), as will be described below.

At 706, if the disambiguation rules should be applied, the disambiguation rules are applied to the input sequence. This may be carried out as described in the method 750. One or more disambiguation rules may be applied by the stroke disambiguation module 310. The input sequence may be received at the stroke disambiguation module 310 from the text prediction module 308. The text prediction module 308 may send a signal to the stroke disambiguation module 310 requesting stroke disambiguation. The text prediction module 308 may also transmit an instruction to highlight or otherwise denote the strokes to which the disambiguation rules have been applied. Stroke disambiguation involves checking the input sequence against one or more disambiguation rules, such as those described above. Where there is more than one disambiguation rule to be applied, the stroke disambiguation module 310 may apply the disambiguation rules in a fixed or preset order. One or more corrected or updated input sequences may thus be found. After one or more disambiguation rules have been applied to the stroke input sequence, the corrected or updated input sequence may be transmitted to the text prediction module 308 for carrying out text prediction.

At 708, the text prediction algorithm is applied to the updated stroke input sequence. For example, this may be carried out by the text prediction module 308, using any suitable text prediction algorithms. For example, the text prediction algorithm may consider the context of any preceding text.

At 710, a signal representing any candidates found is transmitted, for example from the text prediction module 308 to the OS 302, to be displayed on the display 142. One or more candidates may be thus provided to the user for selection. The method 700 may thus end.

Going back to 704, if there is no indication or instruction to apply any disambiguation rules, then at 712, the text prediction algorithm is applied to the input sequence without applying any disambiguation rules. For example, the text prediction algorithm may be applied by the text prediction module 308.

At 714, it is determined whether a required minimum number of candidate characters have been found by the text prediction algorithm. In some examples, the minimum number of candidate characters required may be one.

If the minimum number of candidate characters have not been found (e.g., not one candidate was found), then at 716, the disambiguation rules are automatically applied. For example, the text prediction module 308 may send an instruction to the stroke disambiguation module 310 to apply the one or more disambiguation rules. The stroke disambiguation module 310 may indicate, for example through the use of a flag, that disambiguation rules should be applied, which may ensure that the disambiguation rules will be applied for all subsequent strokes in the stroke sequence. The method 700 then proceeds to 706, as described above.

If at least the minimum required number of candidate characters have been found, then the method 700 proceeds to 718, where a signal representing the candidate is transmitted, as described above with reference to 710.

At 720, an instruction to apply the disambiguation rules may be received. For example, such an instruction may be received at the text prediction module 308, in response to an input, such as a user selection of the disambiguation or "fuzzy" key 510. If so, the method 700 proceeds to 716, as described above.

If no such instruction is received, the method 700 ends.

In some example embodiments, there may be no candidate characters found even after the application of one or more disambiguation rules. For example, where disambiguation rules are designed to correct only one or two incorrect strokes, there may be no candidate characters found for an input sequence having three or more incorrect strokes. In such cases, there are no candidates provided, and it is up to the user to correct the incorrect strokes or attempt to reenter a correct stroke input sequence.

Although the method 700 is described as providing candidate characters, the method 700 may also be used to provide candidate intermediates (e.g., radicals) where such intermediates may be suitable. Selection of a candidate intermediate may affect text prediction for subsequent strokes.

Figure 7:
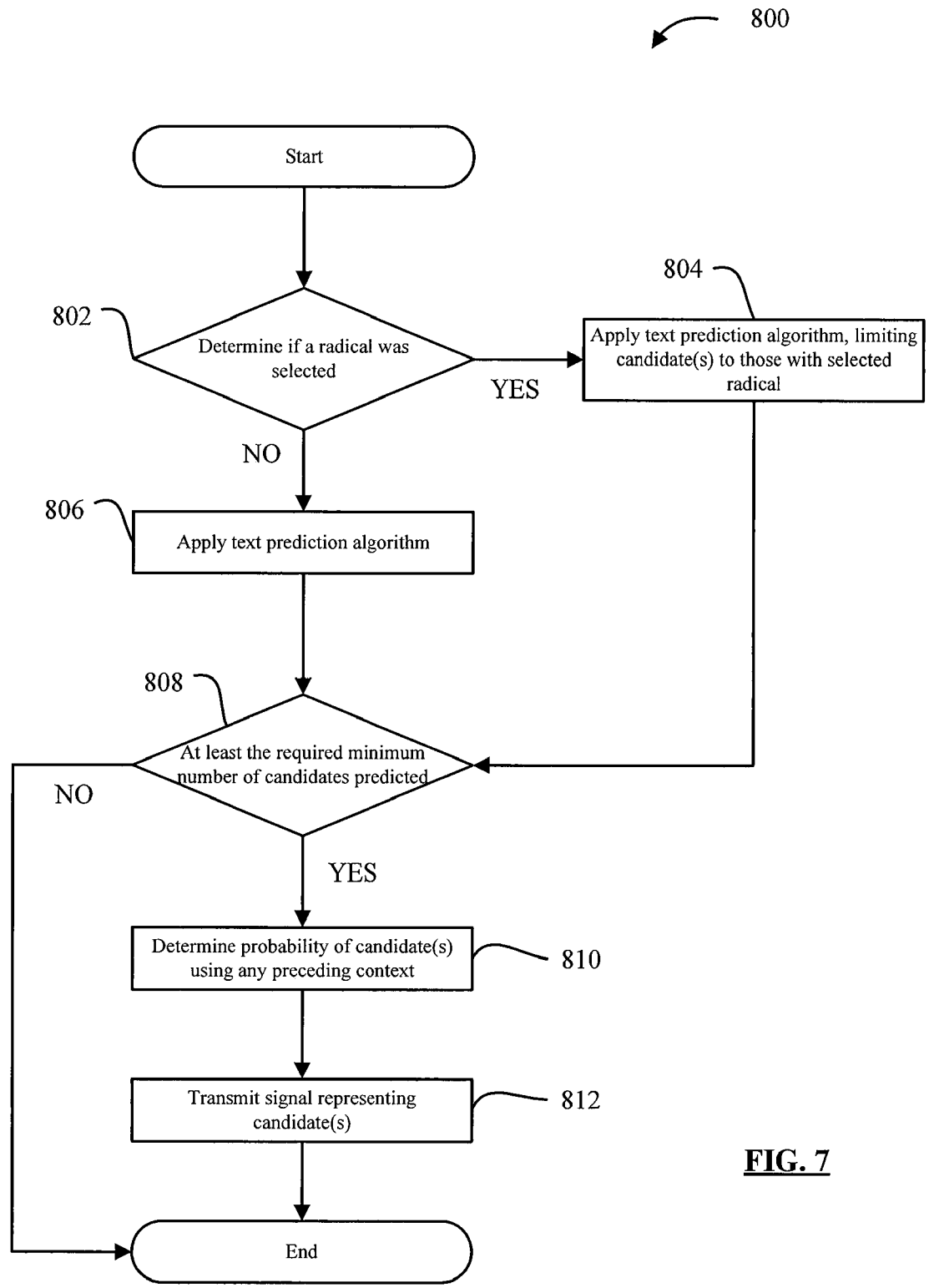
FIG. 7 is a flowchart illustrating an example method of text prediction suitable for the method of FIG. 6B.

Reference is now made to FIG. 7, showing an example method 800 for text prediction. The method 800 may be suitable for carrying out step 708 and/or step 712. The method 800 includes the use of intermediates and context in a text prediction algorithm. Other suitable text prediction algorithms may omit the use of intermediates or context or both. Any suitable text prediction algorithm may be used for step 708 and/or step 712. The method 800 or any other suitable text prediction algorithm may be carried out by the text prediction module 308.

The method 800 begins with a signal representing a partial or complete input sequence. This input sequence may be received at the text prediction module 308. The input sequence may have been corrected or updated according to one or more disambiguation rules as described above, for example from the stroke disambiguation module 310.

At 802, it is determined whether an intermediate has been previously selected. For example, an intermediate may have been selected for an earlier portion of the input sequence, and this selection may be stored in the text prediction module 308.

At 804, if an intermediate was previously selected, the text prediction algorithm is applied and the predicted candidates are limited to those containing the selected intermediate. In some examples, a character may contain more than one intermediate, in which case more than one intermediate may have been previously selected, and the predicted candidates are limited to those containing the more than one selected intermediates.

At 806, if no intermediate was previously selected, the text prediction algorithm is applied to the input sequence. There may be no constraints or limitations to the candidates that may be predicted. The predicted candidates may include intermediates, in addition to complete characters.

At 808, it is determined whether at least a minimum required number of candidates have been predicted. For example, a minimum of one candidate may be required. If the minimum number of candidates has not been predicted, the method 800 may end without providing any candidates for selection. Disambiguation rules may be automatically applied, for example as described above, in this situation.

If at least the minimum required number of candidates have been predicted, then at 810, the probability of each candidate is determined based on any preceding context. If there is no preceding context, such as where there is no preceding text in the composition, or where the preceding text cannot be combined with another character, the candidates may be ordered according to their frequency of use (e.g., within the context of the composition, or based on a history of previous compositions). The frequency of use of all characters may be tracked and stored in a database, for example within the text prediction module 308. Candidates having a higher frequency of use may be ordered with a higher rank than candidates having a lower frequency of use. Where there is preceding context, the context may be used to determine the probability that a predicted candidate would be found following the preceding context. The context may also be used to limit or order the list of candidates, for example where it is known that a certain character cannot immediately follow a given preceding character, that certain character may be removed from the list of candidates or be ordered with a lower rank in the list of candidates.

At 812, the list of candidates is provided. For example, a signal may be transmitted from the text prediction module 308 to the OS 302 representing the list of candidates. This list may be provided, for example by being displayed on the display 142, for selection. Where a probability for each candidate has been determined, for example being based on preceding context, the candidates may be provided in order of probability, for example by showing the candidates in order of decreasing probability. The candidates may be shown in other orders, such as in order of number of strokes, or may be shown in no particular order.

The method 800 thus ends.

Although the method 800 shows the use of intermediates and context in text prediction for stroke input, a suitable text prediction algorithm may involve only the use of intermediates, only the use of context or neither intermediates nor context.

While the steps of the method 750, the method 700 and the method 800 are shown as occurring in a particular order, it will be appreciated by those skilled in the art that many of the steps are interchangeable and may occur in different orders than that shown without materially affecting the end results of the method 750, the method 700 or the method 800. Although certain portions of the method 700 may be carried out using the method 750 or the method 800, the method 700 need not involve the method 750 or the method 800. The method 750, the method 700 and the method 800 may be carried out independently of each other and in the absence of each other. Additionally, while text prediction and stroke disambiguation have been described as being carried out by the text prediction module 308 and the stroke disambiguation module 310, respectively, it will be understood by those skilled in the art that a module or modules similar to the text prediction module 308 and the stroke disambiguation module 310 may be implemented as part of the other software modules on the device. The steps described may be carried out by a single module or may be carried out by several different modules.

While the present disclosure refers to the use of a clickable thumbwheel 160, a selection button 161, a keyboard 154, an input device, or similar navigation and input mechanisms for navigation on the electronic device 102, it will be appreciated by those skilled in the art that navigation, input or both may be provided by the use of a touchscreen display. The display 142 may be a touchscreen display. Navigation or input on a touchscreen display may be by contacting the display directly with fingers, or by using a stylus or a similar pointing device.

While the present disclosure includes description of a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other matter. Moreover, an article of manufacture for the use with the apparatus, such as pre-recorded storage devices or other similar computer readable medium having program instructions tangibly recorded thereon, or a computer program product having computer executable instructions tangibly recorded thereon, may direct an apparatus to facilitate the practice of the disclosed method. A computer data signal carrying computer readable program instructions may also direct an apparatus to facilitate the practice of the disclosed method. It is understood that such apparatus, articles of manufacture, and computer data also come within the scope of the present disclosure.

The example embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

The invention claimed is:

1. An electronic device for disambiguation of stroke input, the device comprising:
a microprocessor for controlling the operation of the device;
an input device coupled to the microprocessor for accepting a stroke input;
a display device for showing a graphical user interface, the display device being coupled to the microprocessor for communicating an output; and
a memory for storing instructions executable by the microprocessor;
the device being configured to:
receive a sequence of input strokes;
apply one or more stroke disambiguation rules to the received sequence of input strokes to generate an updated sequence of input strokes, wherein the stroke disambiguation rules include a rule to correct for an incorrect stroke in the received sequence of input strokes based on similarity between the incorrect stroke and a correct stroke; and
transmit a signal representing the updated sequence of input strokes;
wherein the device is further configured to automatically apply the one or more stroke disambiguation rules to the received sequence of input strokes if less than a required minimum number of candidates is predicted for the received sequence of input strokes.

2. The device of claim 1 wherein the one or more stroke disambiguation rules include a rule to correct for one or more omitted strokes in a stroke sequence.

3. The device of claim 1, wherein the one or more stroke disambiguation rules include a rule to correct for one or more swapped strokes in a stroke sequence.

4. The device of claim 1, wherein the device is further configured to receive an input to perform disambiguation of stroke input.

5. The device of claim 1 being further configured to:
apply a text prediction algorithm on the updated sequence of input strokes to predict one or more candidates; and
transmit a signal representing the one or more candidates to be provided for selection in a candidate list.

6. The device of claim 5, wherein applying a text prediction algorithm comprises determining whether an intermediate was selected and, if an intermediate was selected, transmit only candidates that include the selected intermediate.

7. The device of claim 5, wherein the device is further configured to determine the probability of each candidate based on preceding context, and wherein the one or more candidates are ordered in the candidate list based on the respective determined probability of each candidate.

8. A method for disambiguation of stroke input in an electronic device, the method comprising:
receiving a sequence of input strokes;
applying one or more stroke disambiguation rules to the received sequence of input strokes to generate an updated sequence of input strokes, wherein the disambiguation rules include a rule to correct for an incorrect stroke in the received sequence of input strokes based on similarity between the incorrect stroke and a correct stroke; and
transmitting a signal representing the updated sequence of input strokes;
wherein applying the one or more stroke disambiguation rules comprises automatically applying the one or more stroke disambiguation rules to the received sequence of input strokes if less than a required minimum number of candidates is predicted for the received sequence of input strokes.

9. The method of claim 8, wherein the one or more stroke disambiguation rules include a rule to correct for one or more omitted strokes in a stroke sequence.

10. The method of claim 8, wherein the one or more stroke disambiguation rules include a rule to correct for one or more swapped strokes in a stroke sequence.

11. The method of claim 8, further comprising receiving an input to perform disambiguation of stroke input.

12. The method of claim 8, further comprising:
applying a text prediction algorithm on the updated sequence of input strokes to predict one or more candidates; and
transmitting a signal representing the one or more candidates to be provided for selection in a candidate list.

13. The method of claim 12, wherein applying a text prediction algorithm comprises determining whether an intermediate was selected and, if an intermediate was selected, transmit only candidates that include the selected intermediate.

14. The method of claim 12, further comprising determining the probability of each candidate based on preceding context, and wherein the one or more candidates are ordered in the candidate list based on the respective determined probability of each candidate.

15. A non-transitory computer-readable medium including instructions, executable by a processor, to cause an electronic device to perform a method for disambiguation of stroke input, the method comprising:
receiving a sequence of input strokes;

applying one or more stroke disambiguation rules to the received sequence of input strokes to generate an updated sequence of input strokes, wherein the stroke disambiguation rules include a rule to correct for an incorrect stroke in the received sequence of input strokes based on similarity between the incorrect stroke and a correct stroke; and transmitting a signal representing the updated sequence of input strokes;

wherein applying the one or more stroke disambiguation rules comprises automatically applying the one or more stroke disambiguation rules to the received sequence of input strokes if less than a required minimum number of candidates is predicted for the received sequence of input strokes.

16. The non-transitory computer-readable medium of claim 15, wherein the one or more stroke disambiguation rules include a rule to correct for one or more omitted strokes in a stroke sequence.

17. The non-transitory computer-readable medium of claim 15, wherein the one or more stroke disambiguation rules include a rule to correct for one or more swapped strokes in a stroke sequence.

18. The non-transitory computer-readable medium of claim 15, wherein the method further comprises receiving an input to perform disambiguation of stroke input.

19. The non-transitory computer-readable medium of claim 15, wherein the method further comprises:

applying a text prediction algorithm on the updated sequence of input stokes to predict one or more candidates; and transmitting a signal representing the one or more candidates to be provided for selection in a candidate list.

20. The non-transitory computer-readable medium of claim 19, wherein the method further comprises determining whether an intermediate was selected and, if an intermediate was selected, transmit only candidates that include the selected intermediate.

21. The non-transitory computer-readable medium of claim 19, wherein the method further comprises determining the probability of each candidate based on preceding context, and wherein the one or more candidates are ordered in the candidate list based on the respective determined probability of each candidate.

* * * * *